United States Patent [19]

January et al.

[11] 4,336,658
[45] Jun. 29, 1982

[54] METHOD OF EFFECTING COMPENSATION OF COOPERATIVELY COUPLED VEHICLE WHEEL ALIGNER INSTRUMENTS

[75] Inventors: Daniel B. January, Bel-Ridge; Dean O. Grubbs, Manchester; James M. Grossman, Chesterfield, all of Mo.

[73] Assignee: Hunter Engineering Company, Bridgeton, Mo.

[21] Appl. No.: 172,815

[22] Filed: Jul. 28, 1980

[51] Int. Cl.³ .......................................... G01B 11/275
[52] U.S. Cl. .................................. 33/288; 33/203.18; 33/337; 356/152
[58] Field of Search ................ 33/288, 228, 203.18, 33/335, 336, 337, 203.19, 275 R; 356/155, 152

[56] References Cited

U.S. PATENT DOCUMENTS

| | | | |
|---|---|---|---|
| 2,601,262 | 6/1952 | Carrigan | 33/46 |
| 2,972,189 | 2/1961 | Holub | 33/46 |
| 3,164,910 | 1/1965 | Manlove | |
| 3,181,248 | 5/1965 | Manlove | 33/203.18 |
| 3,337,961 | 8/1967 | Holub | 33/46 |
| 3,892,042 | 7/1975 | Senften | 33/288 |
| 3,963,352 | 6/1976 | Rishovd | 356/152 |
| 4,095,902 | 6/1978 | Florer et al. | 356/155 |
| 4,097,157 | 6/1978 | Lill | 356/152 |
| 4,106,208 | 8/1978 | Hunter | 33/288 |
| 4,126,943 | 11/1978 | Senften | 33/228 |
| 4,138,825 | 2/1979 | Pelta | 33/288 |
| 4,150,897 | 4/1979 | Roberts | 356/152 |
| 4,192,074 | 3/1980 | Chang | 33/288 |
| 4,239,389 | 12/1980 | Hollandsworth et al. | 33/288 X |
| 4,265,537 | 5/1981 | Hunter | 33/288 X |
| 4,274,738 | 6/1981 | Hollandsworth et al. | 33/288 X |
| 4,274,739 | 6/1981 | Grubbs et al. | 33/288 |

Primary Examiner—William D. Martin, Jr.
Attorney, Agent, or Firm—Gravely, Lieder & Woodruff

[57] ABSTRACT

A method of effecting compensation of cooperatively coupled vehicle wheel aligner instruments since a shift or change of position of either one of a coupled pair of angle measuring transducer instruments can introduce changes in the signal values generated in both transducers which are representative of errors not heretofore recognized in prior alignment instruments. The method is directed to initially generating signals responsive to the position of rotation of vehicle wheels at each of two positions 180° apart, simultaneously recording the generated responsive signals from each transducer instrument at each position of rotation of the vehicle wheels, and applying the recorded responsive signals at the two selected positions of wheel rotation upon the initial signals at the selected positions of wheel rotation such that the transducer instrument signals are mutually compensated for aberrations in the relationship of the mounting of the transducer instruments on the vehicle wheels upon being rotated. Apparatus is provided which is particularly unique to performing the steps in the method of this disclosure.

8 Claims, 5 Drawing Figures

METHOD OF EFFECTING COMPENSATION OF COOPERATIVELY COUPLED VEHICLE WHEEL ALIGNER INSTRUMENTS

BACKGROUND OF THE INVENTION

1. Field of the Invention

The invention relates to a method of using wheel alignment apparatus to produce more accurate information about wheel alignment by cooperative coupling of the apparatus to compensate the same and substantially eliminate undesired effects present in the rotational response of the wheels and in the attachment of the apparatus to the wheels.

2. Description of the Prior Art

It is recognized that the alignment of the wheels of a vehicle contributes greatly to its safe operation on the streets and highways. Many different types of apparatus have been provided for diagnosing wheel alignment characteristics. Since there may be errors present in the way the respective vehicle wheels rotate, and since the alignment apparatus may introduce additional errors due to the way the mounting thereof on the wheels is made, it is important to compensate for such errors so as to improve the accuracy in wheel alignment diagnostic results.

There are believed to be three general classes of wheel alignment apparatus, and the prior art may be conveniently placed in those groups.

The least pertinent class relates to the measurement of toe-in characteristics of the steerable wheels, without regard to other wheels. This class typically comprises prior art disclosures found in Bender U.S. Pat. Nos. 2,532,593 of Dec. 5, 1950; MacMillan 3,135,052 of June 2, 1964; MacMillan 3,393,455 of July 23, 1968; Wilkerson 3,426,438 of Feb. 11, 1969; MacMillan 3,443,318 of May 13, 1969; German Offenlegungsschrift No. 1,548,203 of Sept. 25, 1969; Butler 3,865,492 of Feb. 11, 1975; and Senften 4,034,479 of July 12, 1977.

There is a class of prior art in which the main consideration is the toe alignment of steerable wheels, but the relationship of the steerable wheels to the position of the non-steerable wheels is considered to some extent. This class includes prior art patents of Holub U.S. Pat. Nos. 2,972,189 of Feb. 21, 1961; Manlove 3,164,910 of Jan. 12, 1965; Holub 3,337,961 of Aug. 29, 1967; Rishovd et al 3,963,352 of June 15, 1976; Florer et al 4,095,902 of June 20, 1978; Lill 4,097,157 of June 27, 1978; Hunter 4,106,208 of Aug. 15, 1978; and Roberts et al 4,150,897 of Apr. 24, 1979.

Finally the prior art class which has disclosed alignment equipment in which the non-steerable wheel positions have been considered with the positions of the steerable wheel includes Carrigan 2,601,262 of June 24, 1952; Manlove 3,181,248 of May 4, 1965; and Senften 4,126,943 of Nov. 28, 1978.

In addition to the foregoing prior art in the last class, there are more recent patents dealing in some measure with electronic methods for effecting compensation for wheel runout. These are Senften 3,892,042 of July 1, 1975 and Chang 4,192,074 of Mar. 11, 1980. Chang has recognized the teaching of Senften and has carried it into a system for continuously generating inclination signals pertaining to the steerable wheel toe and camber relationships.

BRIEF SUMMARY OF THE INVENTION

In operations for aligning vehicle wheels, or for diagnosing wheel alignment characteristics preparatory to effecting alignment adjustments, the problem is to locate the plane of the wheel relative to the axis of rotation, and to determine the presence of errors which might cause that plane to deviate from the axis of rotation. A further problem arises if the alignment instrumentation is not properly attached to the wheel for then errors can be compounded and the best of available instrumentation will not of itself overcome the errors thus introduced. These problems are significantly overcome by the unique method of compensating the instruments while in the physical positions found after being attached to the wheels.

Electrical transducer devices are the presently preferred instruments for carrying out the objects of the present invention, but this is not to be taken as excluding other types of instruments which generate electrical signals. In any case, compensation of electrical or electronic transducers may be accomplished as taught by Senften in which electronic computation of compensation values is performed from the angles measured by the transducers and subtracting the compensation value from the transducer angles before they are used to compute the alignment angles of the vehicle wheels. In essence, the compensation value for a transducer is computed by observing the change in the angle measured as the wheel rotates about its axis while the transducer device hangs plumb from its axis. The changes observed may have the usual degrees of angular as well as translational freedom of motion. If the axis on which the transducer device is hung is both parallel and colinear with the wheel axis, no change in the angle measured by the transducer should be observed when the wheel is rotated. This is an ideal condition, but if the transducer axis is not ideally related to or with the wheel axis, the measured angle will change and vary sinusoidally as the wheel rotates.

Since most wheel alignment errors or aberrations can be detected by observing chnages which follow a sinewave motion, two measurements of the angle taken 180° apart as the wheel rotates will vary from the desired angle by amounts equal in magnitude but opposite in sign. While the positions most desired are 180° apart, it is understood that some deviation or tolerance to either side of precisely 180° is understood to be included when referring to 180° of separation between positions. If the wheel is rotated to two positions 180° apart and left at one of the two positions, the measured angle will differ from the desired angle by one-half the difference between the angles measured at the two positions. In view of this, compensation of the transducer devices can be arrived at by equations which define compensation values as a function of the angles measured during the wheel rotation procedure. The equations are developed according to the following: Define the location of the transducer devices and the angles each measures; determine the change in position of the transducer devices as the wheels are rotated to positions 180° apart (there are six degrees of freedom—three translational and three rotational); determine the response of the transducers to each of the six degrees of freedom, and determine which degrees of freedom must be compensated, which cannot be compensated, and which can be ignored; and develop the compensation equations in terms of the angles measured at the two positions 180° apart and the responses of the transducer devices.

In the case of four wheel vehicles, the present aligner needs a total of six transducer devices. The transducers may include currently available types, a potentiometer or "pot", the transducer device in Senften U.S. Pat. No. 3,782,831, as well as the dual-diode type transducer means disclosed in Grossman et al application Ser. No. 080,274, filed Oct. 1, 1979. For present purposes the term "transducer device" shall, without limitation, include any of the foregoing enumerated transducers. Also for purposes of this application, transducers require an outside cooperative reference, such as an electro-optical reference, a connective line or an equivalent line of sight reference. The outside reference for transducers can be made responsive through cooperative coupling of spatially separated transducers.

There are angles to be measured with respect to wheel position relative to a transverse axis as well as a longitudinal axis. The transverse reference axis is usually related with the toe position of steerable wheels and the ideal situation is to have the reference axis of the toe transducers parallel to the wheel axis of rotation in a horizontal plane. The reference axis for the longitudinal toe transducers is ideally perpendicular to the wheel axis of rotation in a horizontal plane. In both situations with respect to transverse toe transducers and longitudinal toe transducers, the transducers are related by the cooperative coupling of transducers mounted on the steerable wheel, as well as mounted on the non-steerable wheel. This relationship falls into cooperative coupling between spatially separated transducers, in which each transducer has transmitter and receiver provisions. It is further to be understood that the longitudinal and transverse reference axis of a given wheel are or should be at right angles to each other in a common measurement plane, normally horizontal.

Terminology and reference symbols to be referred to hereinafter need to be set forth in order to develop a clear understanding of how the method for compensating instrumentation applies to electronic vehicle wheel aligners.

The designation for toe transducer angles is as follows:
LC—Left front cross (transverse)
RC—Right front cross (transverse)
LF—Left front longitudinal
RF—Right front longitudinal
LR—Left rear longitudinal
RR—Right rear longitudinal
As it has been mentioned above, there are cooperatively coupled transducers which means that the transducers are utilized in pairs. The designation for the cooperatively coupled pairs is as follows: LC with RC; LF with LR; and RF with RR.

The compensation procedure in relation to a 4-wheel vehicle requires that the transducers are to be installed on the respective wheels by suitable adapters usually or most conveniently attached to the wheel flanges. The adapters are provided with a supporting axle which carries a suitable housing that is at all times permitted to hang plumb or in a gravitionally influenced vertical position. The transducer devices themselves are carried in the housing along with electronic signal pickup and transmitting facilities. Each wheel of the vehicle is elevated sufficiently so it may be rotated between two positions 180° apart. It is preferred that the measurement responses of the transducers should be initiated when the wheel is rotated so that the adapter for the transducer housing is in its vertical upside-down position. That will be called position "2", and electronic signals will be picked up in this position and stored for future utilization. The wheel is then rotated 180° to position "1" where the adapter is returned to its right-side-up vertical position, and second readings of the transducer responses will be picked up and stored in relation to position "1". This procedure should be repeated for each of the other three wheels utilizing the now established position "2" and position "1" convention. When each of the four wheels has been elevated and rotated and then set down on the support surface without displacement from the position "1" attitude, the stored signals may then be fed into a computer, and such signals will be used to compensate for any irregularities in wheel runout, bent axles and non-alignment of the wheel axis with the axis of pendular support for the transducers.

The transducers for measuring wheel toe angles may be affected by both translational and rotational displacements due to both wobble and radial runout. This occurs by reason of the fact that the toe transducers utilized for effecting toe measurements are spacially separated and must be related by cooperative coupling. The effect of displacement of the transducer will require compensation.

The effects of rotational and translational displacement of the transducers must be analyzed in terms of the cooperative coupling of transducer pairs, such as transversely related pairs of transducers. It can be understood that rotation about the wheel axis of rotation plays no part in compensation for this movement since the transducer support hangs plumb during this type of rotation. However, rotation about a vertical axis due to wobble runout results in some movement or disturbance in the reference axis of both transversely and longitudinally coupled transducers, and this directly affects the measured angle. The wobble runout can be compensated in the following equations:

$$CLC = LC - \tfrac{1}{2}(LC1 - LC2)$$

$$CRC = RC - \tfrac{1}{2}(RC1 - RC2)$$

$$CLF = LF - \tfrac{1}{2}(LF1 - LF2)$$

$$CRF = RF - \tfrac{1}{2}(RF1 - RF2)$$

$$CLR = LR - \tfrac{1}{2}(LR1 - LR2)$$

$$CRR = RR - \sim(RR1 - RR2)$$

In the lefthand expression in each equation, the capital "C" in the quantity CLC refers to the fact that the quantity LC is compensated. The term "LC1" in the first equation means the signal of transducer LC at position "1", while the "2" means output at position "2". This convention applies to each of the 6 equations.

It should now be appreciated that the important aspect for compensating cooperative coupling of transducers for runout is that if one transducer experiences translational displacement due to runout, then the cooperatively coupled transducer must also be compensated for that runout. It is important to realize that translation in any direction in the measurement plane causes the cooperative coupling relationship to be disturbed and, hence, the angles measured by the respective cooperatively coupled transducers are subject to change. It is recognized that there is a single obvious exception and that occurs when the translational motion is truly in the direction toward or away from the cooperatively coupled transducers so that the spacial relation simply changes its distance measurement. Translation can be thought of as the sum of motions in orthogonal directions, and runout causes translations which are sinusoidal in nature. This sinusoidal motion affects the orthogonal translations and imparts identical frequencies but independent phases.

Translational displacement of one transducer due to runout differs from rotational displacement in that it involves a displacement of the cooperative connection between the cooperative transducers. Thus, translational displacement affects the angles measured by both transducers. The importance attached to compensating cooperative toe transducer pairs for runout is that if one transducer experiences translational displacement due to runout, then both transducers need to be compensated for that runout. If the translational motion is in a vertical direction, it is in a direction perpendicular to the transducer measurement plane and so does not change the projection of the cooperative connection onto the measurement plane. This type of runout causes no change in the angle measured by either transducer and no compensation is needed.

On the other hand, translation of a transducer in any direction in the measurement plane causes the cooperative connection with a cooperative transducer to move. Hence, the angles measured by both transducers change. As pointed out above, the single exception to this is when the translation is in a direction to change the distance separating the transducers. It can be shown that there are three types of runout which toe transducers must be compensated for. These runouts are characterized by the motions imparted to the transducers during the compensation procedure. The runout types are (1) rotation about a vertical axis; (2) translation in the transducer measurement plane in a given direction; and (3) translation in the transducer measurement plane in a direction substantially at 90° from the direction mentioned in (2) above.

These three motions are independent, they are sinusoidal in nature, and of identical frequency, but have independent phases and amplitudes. Therefore, the offset in the angle measured by a transducer is the algebraic sum of the offsets caused by these motions. Compensation can be obtained simultaneously by the equations and procedure described for compensation of simple rotation about the vertical axis, as follows:

$CLC = LC - \frac{1}{2}(LC1 - LC2)$ $CRC = RC - \frac{1}{2}(RC1 - RC2)$ $CLF = LF - \frac{1}{2}(LF1 - LF2)$ $CRF = RF - \frac{1}{2}(RF1 - RF2)$ $CLR = LR - \frac{1}{2}(LR1 - LR2)$ $CRR = RR - \frac{1}{2}(RR1 - RR2)$ Since there are three toe transducer pairs on a vehicle: one pair transverse at the steerable wheels, and one pair longitudinally of the steerable and non-steerable wheels at each side, within each pair each transducer must cross-compensate or cooperatively compensate the other transducer. This means each transducer is compensated by measurements recorded at that transducer while the wheel for the cooperatively coupled transducer is rotated through the compensation procedure. These angles are given the usual names as explained above, but a suffix is added to distinguish that the measurement was made as a different wheel was rotated through positions 1 and 2. The suffixes are;

lf is left front wheel rotated
rf is right front wheel rotated
lr is left rear wheel rotated
rr is right rear wheel rotated Thus the full compensation equations are as follows:

$CLC = LC - \frac{1}{2}(LC1 - LC2) - \frac{1}{2}(LC1\ rf - LC2\ rf)$ $CRC = RC - \frac{1}{2}(RC1 - RC2) - \frac{1}{2}(RC1\ lf - RC2\ lf)$ $CLF = LF - \frac{1}{2}(LF1 - LF2) - \frac{1}{2}(LF1\ lr - LF2\ lr)$ $CRF = RF - \frac{1}{2}(RF1 - RF2) - \frac{1}{2}(RF1\ rr - RF2\ rr)$ $CLR = LR - \frac{1}{2}(LR1 - LR2) - \frac{1}{2}(LR1\ lf - LR2\ lf)$ $CRR = RR - \frac{1}{2}(RR1 - RR) - \frac{1}{2}(RR1\ rf - RR2\ rf)$ The equations can be described in the following way: The compensated transducer angel (CLC) equals the raw measured transducer angle with the wheel at position 1 (LC), minus the offset caused by runout of the wheel and wheel hanger assembly [$\frac{1}{2}$(LC1−LC2)], minus the offset caused by translational runout of the wheel and wheel hanger assembly of the cooperatively coupled transducer [$\frac{1}{2}$(LC1 rf−LC2 rf)].

An important object of this invention is to provide an arrangement of vehicle wheel position responsive transducers for each wheel of a vehicle such that the transducers generate signal outputs that are compensated for undesired effects in the positions of alignment of the wheels relative to its axle, as well as compensated for undesired effects in the positions of the transducers relative to the planes of wheel rotation.

It is another object of this invention to provide a unique method of applying angle measuring transducers to the several vehicle wheels so that by cooperative coupling of certain of the transducers between pairs of wheels, and by rotating the wheels between positions 180° apart, the cooperatively coupled transducers can be made to generate signals which have been compensated to substantially eliminate undesired effects in position of the wheels relative to the axles for such wheels.

BRIEF DESCRIPTION OF THE DRAWINGS

A presently preferred embodiment of instrumentation for carrying out the method of the present invention has been illustrated in the drawings, wherein.

DETAILED DESCRIPTION OF THE PREFERRED EMBODIMENT

Figure 1:
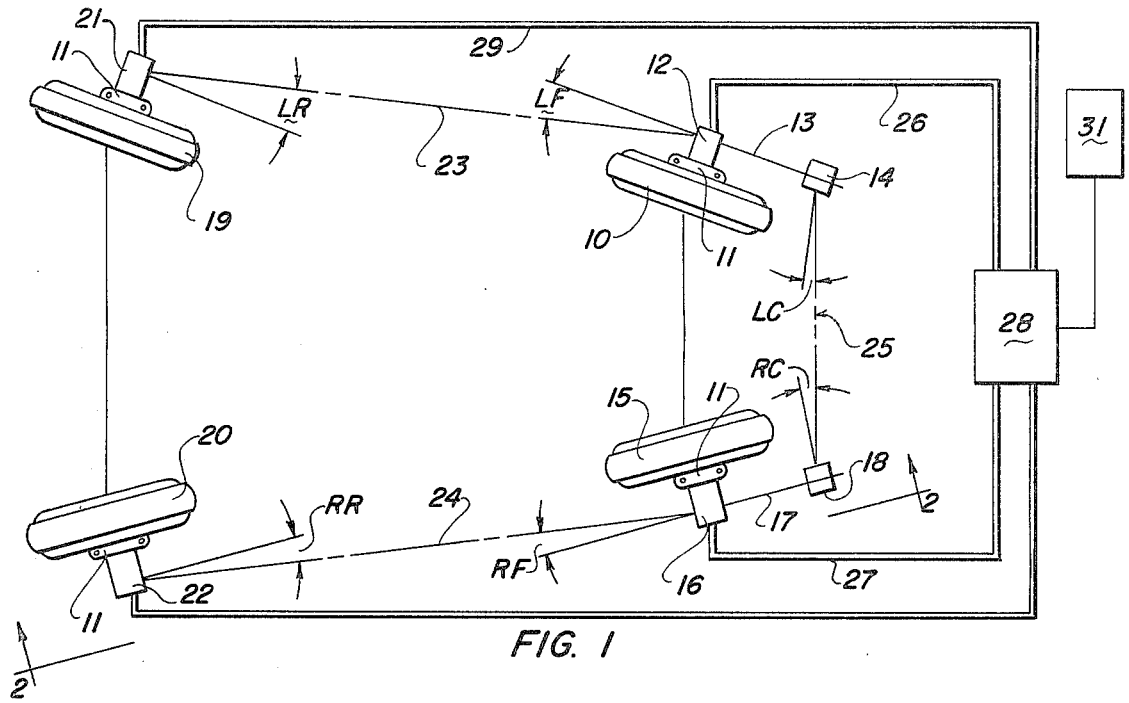
FIG. 1 is a schematic diagram of the four wheels of a vehicle and the associated instruments.

The view of FIG. 1 illustrates the arrangement of the instrumentation in relation to the usual vehicle wheels. As shown, the left front steerable wheel 10 with accentuated toe-in is provided with a wheel rim adapter 11 which supports an instrument box 12 and a toe arm 13 for support of a transducer assembly 14. The right front steerable wheel 15 with accentuated toe-in is provided with a wheel rim adapter 11 like the first mentioned adapter. The adapter 11 also supports instrument box 16 and a toe arm 17 for support of a transducer assembly 18. Similar wheel rim adapters 11 are attached to the left and right rear wheels 19 and 20 for the support of instrument boxes 21 and 22. These rear wheels are shown with accentuated toe-in positions.

The diagram of FIG. 1 identifies the wheel alignment toe angles of importance in the manner previously described as LC, RC, LF, RF, LR and RR. Transducer devices in the boxes 12 and 21 may be cooperatively coupled along the longitudinal axis 23, transducer devices in boxes 16 and 22 may be cooperatively coupled along the longitudinal axis 24, and the assemblies 14 and 18 may be cooperatively coupled along the transverse axis 25. The signals generated by the transducers at the respective front wheels 10 and 15 are transmitted by leads 26 and 27 into a suitable console 28, and other leads 29 and 30 transmit signals from the instruments in boxes 21 and 22 to the console 28. The console 28 houses computer means which performs the necessary computation of the signals for purposes of display at the unit 31 which may be a CRT display, analog meters, or other similar means.

Figure 2:
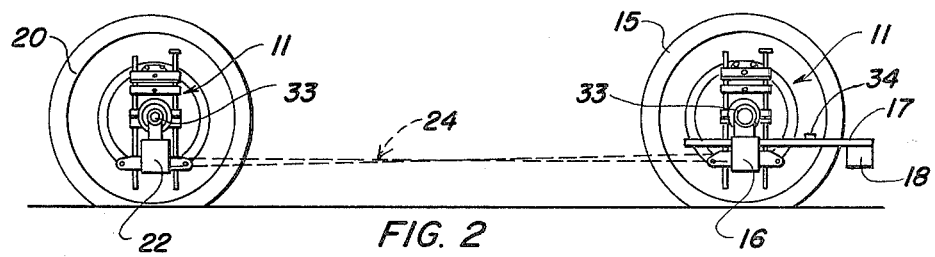
FIG. 2 is a side elevational view taken along line 2—2 in FIG. 1 of the mounted instruments for the wheels at the right side of a vehicle, the instrumentation at the opposite or left side being mirror images thereof.

In FIG. 2 it can be seen that the adapters 11 are clamped onto the rim of the wheels 15 and 20 in a right-side-up vertical position. Each one is provided with a pendular support 33 for the instrument boxes 16 and 22. The box 16 is associated with a toe-arm 17 for support of the transducer assembly 18, and a spirit level 34 is mounted on the toe-arm so the arm can be brought into a horizontal position. In view of the pendular support 33, the instrument boxes 16 and 22 are free to hang plumb while the wheels 15 or 20 are rotated to bring the adapters 11 into an upside-down position at 180° from the position shown in FIG. 2. As pointed out above, the arrangement of adapters and instrument boxes and toe-arm disposed on the wheels at the left side of the vehicle is a mirror image of that which is shown in FIG. 2 and no additional description is believed necessary.

Figure 3:
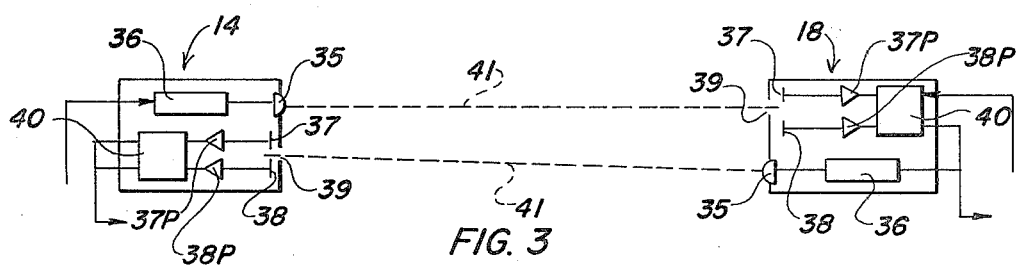
FIG. 3 is a schematic diagram of a dual diode system of transducers in cooperative coupled relation, the view being typical of the transducers in either transverse or longitudinal coupled relation.

FIG. 3 is a diagram of a cooperatively coupled pair of transducers which comprise photo-diode detectors and related emitters which may be those situated at 14 and 18 on the respective toe-arms 13 and 17 (FIG. 1). Since each is identical, the parts will be designated by the same reference numerals. A radiant energy beam emitter 35 is connected to a suitable conditioning circuit 36, and adjacent thereto is a pair of photodiode detectors 37 and 38 positioned behind a window opening 39. The diodes are connected to preamplifier means 37P and 38P for converting the current generated at the diodes into voltage for processing in detected signal conditioning means 40 to produce output signals from preamplifier means 37P and 38P which electronically filter the amplified signals to isolate the emitter signals and eliminate interference due to noise and ambient light. In order to obtain angular information the signals from the preamplifiers 37P and 38P must be processed in separate circuits. The angular information is developed by the difference in current generated by the diodes due to the angular position between the axis of the beam 41 from the cooperatively coupled transducer assembly (either assembly 14 or 18) and a reference axis which is perpendicular to the plane of the window 39. Thus, the measured angle is dependent on the area of each diode 37 or 38 which is most exposed to the emitter influence. The current flowing in each detector 37 and 38 is proportional to the influence of the beam 41 on each, and the means 40 must measure the currents and convert them to DC voltage for suitable signal computation in console means 28 (FIG. 1). What has been disclosed and described in reference to FIG. 3 has been previously set forth in greater detail in the copending application of Grossman and January, Ser. No. 080,274, filed Oct. 1, 1979, and is incorporated herein by reference.

While FIG. 3 has been described in relation to the transducer assemblies 14 and 18 mounted at the outer end portions of the respective toe arms 13 and 17, it is intended to provide an identical transducer assembly (not shown) in each of the instrument boxes 12 and 16 on the adapters 11 for the front wheels 10 and 15, and also in each instrument box 21 and 22 on the adapters 11 for the rear wheels 19 and 20. In this way, what is shown diagrammatically in FIG. 3 for the transverse coupling of cooperating transducers, is also representative for longitudinal coupling of cooperating transducers at each side between front and rear wheels.

Figure 4:
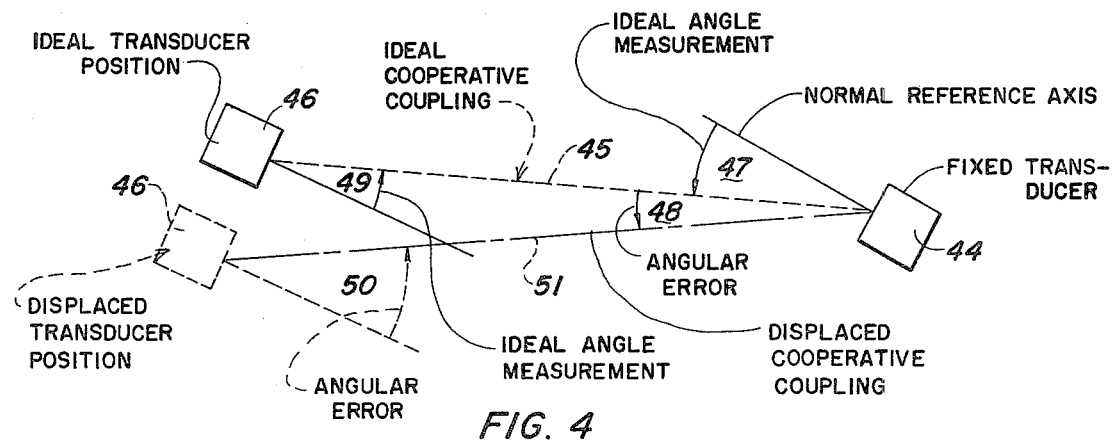
FIG. 4 is a diagram illustrating the effect of error in the angular measuring response of a cooperatively coupled pair of transducers when one transducer is displaced due to the presence of runout upon rotation of the wheel supporting the displaced transducer.

Turning now to FIG. 4, it can be seen that a transducer instrument in box 44 located in a fixed position is cooperatively coupled along an ideal alignment axis 45 with a second transducer instrument in box 46. Upon rotation of the wheel supporting box 46, runout present will cause the box 46 to be displaced to the dotted line position. The result of the displacement is that the ideal angle 47 has picked up an error represented by angle 48 due to the displacement or shift in the position of box 46. Likewise, the ideal angle 49 measured at box 46 has now become a different angle 50 having a larger value. The error angle 48 and the angle 50 are now related to a shifted alignment axis 51. The transducers in the boxes 44 and 46 share a coupling axis represented by the ideal axis 45 or the shifted axis 51. When electro-optical transducer devices are used there is formed an imaginary reference axis or line-of-sight axis. If the transducer devices are electro-mechanical, the reference axis is usually formed by a cord or elastic line physically connecting the devices and causing movement of a potentiometer or similar device.

Applying the example of cooperatively coupled transducers described in FIG. 4 to the view of FIG. 3, and remembering that in FIG. 3 the transducer assemblies 14 and 18 are cooperatively coupled across or transversely of the vehicle of FIG. 1, it can be understood that as transducer assembly 14 is displaced relative to the fixed position of the transducer assembly 18, the coupling axes 41 of the radiant energy beams will enter the respective windows 39 at other than perpendicularly. The result of the shift or displacement of one transducer assembly relative to its coupled transducer assembly is that the photodiodes 37 and 38 respond by generating unbalanced voltage signals which represent the angle of incidence of the beams relative to a perpendicular to the plane of the windows 39. As demonstrated in FIG. 4, a shift or change of position of either one of a coupled pair of transducers will introduce changes in the voltage signals in both transducers representative of errors not heretofore recognized in available alignment instruments.

What has been disclosed in FIGS. 3 and 4 can be recognized as being applicable to transducers coupled longitudinally at each side of a vehicle. An example in FIG. 1 is that the transducers carried by the right front wheel 15 are cooperatively coupled, one with the transducer carried by the opposite left front wheel, and the other with the transducer carried by the right rear wheel. It can be appreciated now that as the right front wheel 15 is rotated into the positions 1 and 2 before described, the pairs of cooperatively coupled transversely and longitudinaly located transducers will respond to runout and wobble reactions of the wheel 15. This relationship also exists for the left front wheel 10. However, the rotation of the rear wheels each affects only one pair of cooperatively coupled transducers.

The compensation procedure for the respective transducers is quite easily learned. It involves first attaching the adapters 11 (FIG. 2) to each wheel 10, 15, 19 and 20 and sliding the center support on the parallel rods in a direction such that the axis of the pendular member is substantially aligned with the wheel hub. Then without regard to which wheel is selected first, one wheel at a time is raised and then with the adapter in its normal vertically upright position (as seen in FIG. 2 which defines position 1) the wheel is rotated into position 2 where the adapter is upside down at substantially 180° from the starting position. The position of the transducer is brought to a level attitude, or the support hangs properly, and then a first switch is closed so the transducer signal response can be transmitted into circuits in the console 28 for processing as will be explained presently. The wheel is then rotated into position 1 where the adapter is returned to its upright position. A second switch is closed after leveling the instrument, and without changing the wheel position, it is lowered to the support. This step-by-step procedure is repeated at each wheel. As will appear, when carrying out the procedure at each front wheel, the closing of the switches at positions 2 and 1 will affect both transducers in boxes 12 and 14 at the left wheel and both transducers in boxes 16 and 18. In this manner, signals from each of six transducers will be transmitted into the console 28.

The angles stored in response to the foregoing procedure can be identified by reference to the following tabulation:

| Wheel | ANGLES STORED AT | |
|---|---|---|
| | Position 2 | Position 1 |
| LF | LC2 | LC1 |
| | LF2 | LF1 |
| | RC2 lf | RC1 lf |
| | LR2 lf | LR1 lf |
| RF | RC2 | RC1 |
| | RF2 | RF1 |
| | LC2 rf | LC1 rf |
| | RR2 rf | RR1 rf |
| LR | LR2 | LR1 |
| | LF2 lr | LF1 lr |
| RR | RR2 | RR1 |
| | RF2 rr | RF1 rr |

The signals generated at each position of the respective wheels are transmitted into the console 28. These signals are of two types: raw uncompensated transducer angle signals, and compensation switch logic signals. The raw angle signals are analog voltages representing the angles measured by the transducers. Ths signals from the left from wheel LC are LC and LF; from the right front wheel are RC and RF; from the left rear LR; and from the right rear RR.

The embodiment referred to above involves two conpensate switches at each wheel. Each switch produces a logic signal, defined as a "low" or substantially zero volts when the switch is opened; and defined as a "high" or substantially 5 volts when the switch is closed during the compensation procedure. The switches are numbered so that compensate switch 1 is actuated only when the wheel is in position 1, and compensate switch 2 is actuated only when the wheel is in position 2.

The compensation procedure has two variations, the first one being that described above. The second variation is to choose a position 1 which defines a position 2, rotate the wheel to position 1 and actuate switch 1 at that wheel only, rotate the wheel to position 2 180° away from position 1 and actuate switch 2 at that wheel only, and return the wheel to position 1. The two variations produce identical results provided the operator leaves the wheels at what has been chosen to be position 1.

Figure 5:
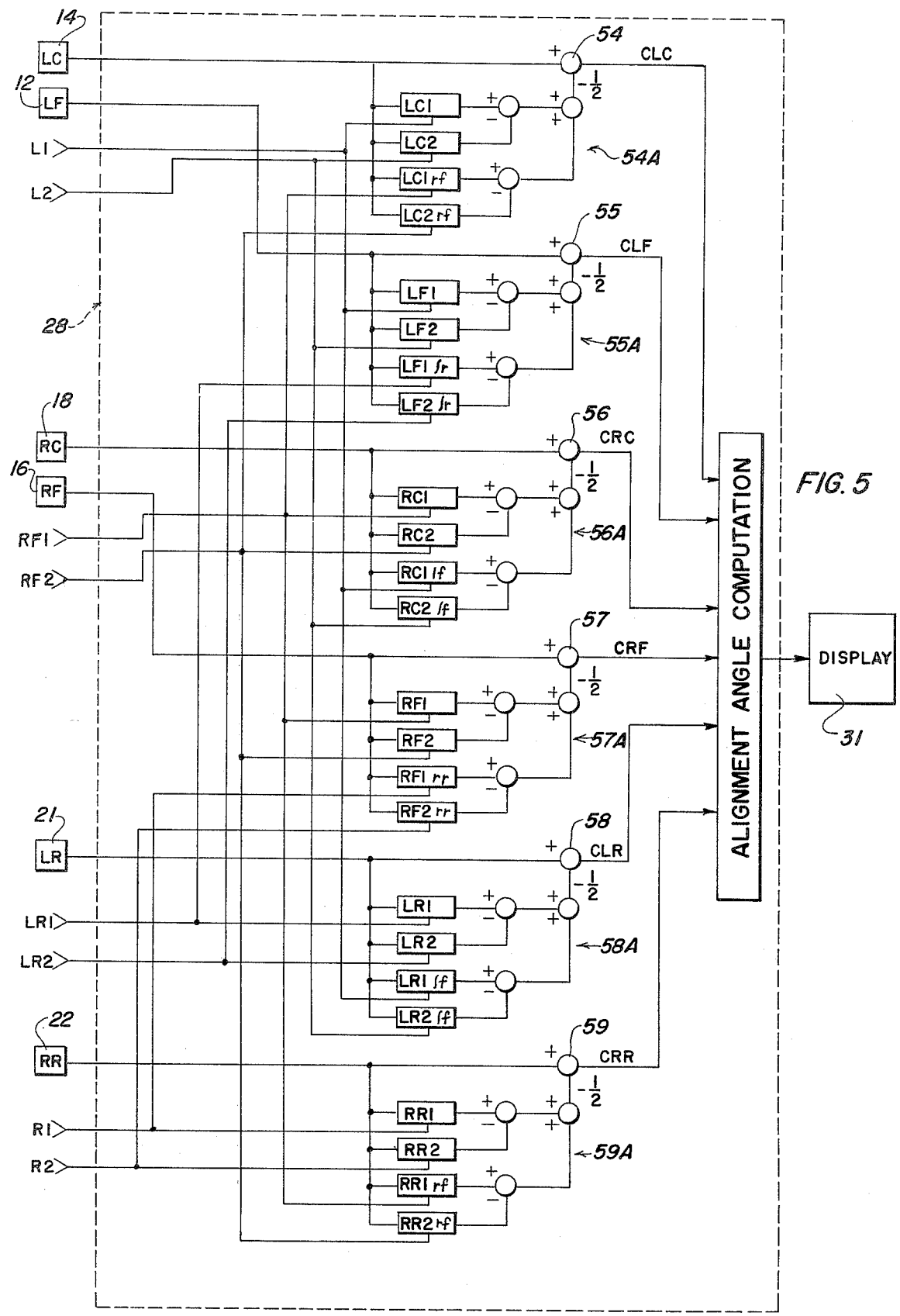
FIG. 5 is a system diagram illustrating the present method of effecting compensation of wheel position responsive transducers.

The compensation system must be constructed such that the proper data is stored at each position, and it is easily done with two switches as noted above. The compensated transducer signals are produced by subtracting "compensation values" from the raw transducer signals. The compensation values are produced by adding and subtracting signals stored when the compensation switches are actuated. The storage of analog signals is accomplished with analog memories, or sample-and-hold circuits. For example, when the operator rotates the front wheel to position 2 and actuates switch 2, the angles stored are LC2, LF2, RC2 lf and LR2 lf. This occurs because the left front compensate switch is connected in the console 28 to the control inputs of four sample-and-hold circuits whose inputs are connected in the console 28 to the LC, LF, RC and LF transducer signals respectively. When the operator rotates the left front wheel to position 1 and actuates switch 1, angles LC1, LF1, RC1 lf and LR1 lf are generated. This occurs because the left front compensate switch 1 is connected in console 28 to the control inputs of four other sample-and-hold circuits whose inputs are connected in console 28 to the LC, LF, RC and LR transducer signals respectively. It can now be understood that actuating the compensate switches at a given wheel mounted instrument causes transducer angle signals to be stored which originate at each of the four wheels. This is accomplished by connecting the compensate switch signals in the console 28 to the control input of the appropriate sample-and-hold circuits, all as shown in FIG. 5. The sample-and-hold circuits are connected appropriately to adder and subtractor circuits, with the result that six compensated angle signals are produced and fed into an alignment angle computer.

Turning now to FIG. 5, and having in mind the arrangement of cooperatively paired transducers in boxes 14 and 18, 12 and 21, and 16 and 22, when the left front wheel 10 is rotated to position 2 and switch L2 is actuated, transducer LC stores value at sample-and-hold circuit LC2. At the same time, transducer LF stores angle value at sample-and-hold circuit LF 2. The sample-and-hold circuit RC2 lf aasociated with the transducer RC, and the sample-and-hold circuit LR2 lf associated with transducer LR are energized to store those angle valves. On returning the left front wheel LF to position 1, and actuating switch L1, angle value is stored in a sample-and-hold circuit LC1 from transducer LC, angle value is stored in sample-and-hold circuit LF1 from the transducer LF, angle value is stored in sample-and-hold circuit RC1 lf from transducer RC, and angle value is stored in sample-and-hold circuit LR1 lf from transducer LR.

Similarly, when the operator moves to the right front wheel 15 and rotates it into position 2 and actuates switch RF2, angle value is stored in sample-and-hold circuit RC2 from transducer RC, angle value is stored in sample-and-hold circuit RF2 from transducer RF, angle value is stored in sample-and-hold circuit LC2 lf from transducer LC, and angle value is stored in sample-and-hold circuit RR2 lf from transducer RR. When the right front wheel is rotated to position 1 and switch RF1 is actuated, angle value is stored in sample-and-hold circuit RC1 from transducer RC, angle value is stored in sample-and-hold circuit RF1 from transducer RF, angle value is stored in sample-and-hold circuit LC1 lf from transducer LC, and angle value is stored in sample-and-hold circuit RR1 lf from transducer RR.

Having completed the rotation of each front wheel to positions 2 and 1 and actuated the respective switches L1, L2, RF1 and RF2, the operator can proceed to the left rear wheel 19 and rotate it into position 2 and actuate switch LR2 so that angle value is stored in sample-and-hold circuit LR2 from transducer LR, and angle value is stored in sample-and-hold circuit LF2 lr from transducer LF. On rotating the left rear wheel 19 to position 1 and actuating switch LR1, angle value is stored in sample-and-hold circuit LR1 from transducer LR, and angle value is stored in sample-and-hold circuit LF1 lr from transducer LF. Finally, on rotating the right rear wheel RR to position 2 and actuating switch R2, angle value is stored in sample-and-hold circuit RR2 from transducer RR, and angle value is stored in sample-and-hold circuit RF2 rr from transducer RF. When the right rear wheel is rotated to position R1, angle value is stored in sample-and-hold circuit RR1 from transducer RR, and angle value is stored in sample-and-hold circuit RF1 rr from transducer RF.

The foregoing description pertains to FIG. 5 and shows the various circuit connections made within the console 28. Having stored wheel angle position signals in the various sample-and-hold circuits, the information proceeds through adder and subtractor circuits 54A, 55A, 56A, 57A, 58A and 59A with the resulting compensated angle values as follows: The raw angle value from transducer LC is modified and compensated in the adder and subtractor circuit 54. For example, the output CLC is the product of the raw angle LC reduced by the quantity $\frac{1}{2}(LC1-LC2)$ and $\frac{1}{2}(LC1\ rf-LC2\ rf)$. When presented in tubular form, the compensation terms are as follows:

| Comp. Angles | Raw Angles | Self Comp. | Cross Comp. |
|---|---|---|---|
| CLC | = LC − | $\frac{1}{2}$(LC1−LC2) − | $\frac{1}{2}$(LC1 rf−LC2 rf) |
| CRC | = RC − | $\frac{1}{2}$(RC1−RC2) − | $\frac{1}{2}$(RC1 lf−RC2 lf) |
| CLF | = LF − | $\frac{1}{2}$(LF1−LF2) − | $\frac{1}{2}$(LF1 lr−LF2 lr) |
| CRF | = RF − | $\frac{1}{2}$(RF1−RF2) − | $\frac{1}{2}$(RF1 rr−RF2 rr) |
| CLR | = LR − | $\frac{1}{2}$(LR1−LR2) − | $\frac{1}{2}$(LR1 lf−LR2 lf) |
| CRR | = RR − | $\frac{1}{2}$(RR1−RR2) − | $\frac{1}{2}$(RR1 rf−RR2 rf) |

Referring again to FIG. 1, it is apparent that the angle measured by the transducer LC in box 14 is bounded in the measurement plane by the reference axis 25 and the projection onto that plane of the line-of-sight or cooperative coupling of transducers LC and RC in the respective boxes 14 and 18. However, cooperative transducer RC in box 18 measures an angle RC but it has its own measurement plane and reference axis which are not necessarily related to those of transducer LC in box 14. The transducers in boxes 14 and 18 cooperate because they have a common cooperative coupling relationship. Considering, therefore, the before identified transducer pairs (FIG. 1), they are oriented such that their measurement planes are generally or substantially horizontal. The cooperative coupling axes extend between longitudinally spaced transducers, as axes 23 and 24, and the axis 25 extends across or transversely at the front of the vehicle. The transducers in boxes 12 and 14, or in boxes 16 and 18 share a common measurement plane with their axes aligned at substantially 90°. The transducers in boxes 21 and 22 at the rear wheels have only longitudinal axes. In order to avoid errors for wheels in which the tires are not of the same diameter, care must be exercised to have all tires properly inflated, or mismatched tires removed and matched tires installed.

What is claimed is:

1. A method of effecting compensation of the signals from cooperatively coupled transducer instruments in vehicle wheel alignment apparatus for aberrations in said apparatus and in said vehicle wheels, said method comprising:
   (a) Mounting a pair of transducer instruments, one to each of a pair of vehicle wheels, such that the transducer instruments are in cooperatively coupled relationship and generate signals responsive to the angular position of said vehicle wheels;
   (b) Rotating said vehicle wheels, one at a time, into selected positions substantially 180° apart;
   (c) Storing said signals generated by both transducer instruments at each selected position of each said vehicle; and
   (d) Compensating the signal from one of the cooperatively coupled pair of transducer instruments with the stored signals generated in response to aberrations in the other transducer instrument of the cooperatively coupled pair on the vehicle wheels and from the reaction of the vehicle wheels upon being rotated into the selected positions.

2. The method set forth in claim 1, wherein the transducer instruments are mounted on the steerable wheels of the vehicle.

3. The method set forth in claim 1, wherein one transducer instrument is mounted on a steerable wheel and the other transducer instrument is mounted on a non-steerable wheel of the vehicle.

4. The method set forth in claim 1, wherein the selected position of rotation of each vehicle wheel is initially from a first position where transducer instrument signals are stored, to a second position substantially 180° from the first position where transducer instrument signals are stored, and finally to said first position for wheel set down.

5. The method set forth in claim 1, wherein the selected position of rotation of each vehicle wheel is initially to a second position substantially 180° from a first position, where transducer instrument signals are stored, then back to said first position where transducer instrument signals are stored, followed by wheel set down.

6. In apparatus having vehicle wheel alignment transducer instruments for generating signals representative of vehicle wheel alignment angles, and in which the transducer instruments are mounted one on each of a cooperatively coupled pair of vehicle wheels, the improvement comprising:
(a) first circuit means for storing the signals generated by each transducer instrument when at positions of wheel rotation substantially 180° apart; and
(b) second circuit means for compensating the signal from one of the cooperatively coupled pair of transducer instruments with the stored signals generated by said one transducer instrument through said first circuit means in response to aberrations in the other transducer instrument of the cooperatively coupled pair, in the mounting of said other transducer instrument on its wheel, and from the reaction of the last mentioned wheel corresponding to its positions upon being rotated to said positions substantially 180° apart.

7. The apparatus set forth in claim 6, wherein the transducer instruments are mounted on the steerable wheels of the vehicle.

8. The apparatus set forth in claim 6, wherein one transducer instrument is mounted on a steerable whel and the other transducer instrument is mounted on a non-steerable wheel of the vehicle, both said steerable and non-steerable wheels being on the same side of the vehicle.

* * * * *

UNITED STATES PATENT AND TRADEMARK OFFICE
CERTIFICATE OF CORRECTION

PATENT NO. : 4,336,658

DATED : June 29, 1982

INVENTOR(S) : Daniel B. January, Dean O. Grubbs and James M. Grossman

It is certified that error appears in the above-identified patent and that said Letters Patent are hereby corrected as shown below:

Column 2, line 43, "chnages" should be "changes".

Column 3, line 35, "axis" should be "axes".

Column 4, line 51, "CRR=RR-~(RR1-RR2)" should be "CRR=RR-1/2(RR1-RR2)".

Column 6, line 23, "CRR=RR-1/2(RR1-RR)-1/2(RR1 rf-RR2 rf)" should be "CRR=RR-1/2(RR1-RR2)-1/2(RR1 rf-RR2 rf)".

Column 9, line 18, "longitudinaly" should be "longitudinally".

Column 10, line 7, "from wheel" should be "front wheel".

UNITED STATES PATENT AND TRADEMARK OFFICE
CERTIFICATE OF CORRECTION

PATENT NO. : 4,336,658

DATED : June 29, 1982

INVENTOR(S) : Daniel B. January, Dean O. Grubbs and James M. Grossman

It is certified that error appears in the above-identified patent and that said Letters Patent are hereby corrected as shown below:

Second Page

Column 10, line 67, "stores value" should be

"stores angle value.

Column 11, line 59, "tubular" should be "tabular".

Column 14, line 14, "whel" should be "wheel".

Signed and Sealed this

Ninth Day of November 1982

[SEAL]

Attest:

GERALD J. MOSSINGHOFF

Attesting Officer     Commissioner of Patents and Trademarks